United States Patent [19]
Ogawa et al.

[11] Patent Number: 5,201,547
[45] Date of Patent: Apr. 13, 1993

[54] REAR UNDER BODY STRUCTURE

[75] Inventors: Hisashi Ogawa; Masao Inoue, both of Okazaki, Japan

[73] Assignee: Toyota Jidosha Kabushiki Kaisha, Toyota, Japan

[21] Appl. No.: 848,211

[22] Filed: Mar. 10, 1992

[30] Foreign Application Priority Data

| Apr. 10, 1991 | [JP] | Japan | 3-77875 |
| Apr. 10, 1991 | [JP] | Japan | 3-77876 |
| Apr. 10, 1991 | [JP] | Japan | 3-77877 |
| Apr. 10, 1991 | [JP] | Japan | 3-77878 |

[51] Int. Cl.$^5$ .................................. B60K 15/08
[52] U.S. Cl. .................................. 280/834; 296/195; 296/204
[58] Field of Search ............... 296/195, 204; 280/834

[56] References Cited

U.S. PATENT DOCUMENTS

4,416,461 11/1983 Hayashi et al. ................. 280/834

FOREIGN PATENT DOCUMENTS

| 61-24225 | 2/1986 | Japan . |
| 62-52026 | 3/1987 | Japan . |
| 1-93125 | 6/1989 | Japan . |
| 2-105023 | 8/1990 | Japan . |
| 3-53320 | 5/1991 | Japan . |
| 3-53321 | 5/1991 | Japan . |
| 3-53322 | 5/1991 | Japan . |
| 3-53385 | 5/1991 | Japan . |
| 3-53386 | 5/1991 | Japan . |
| 3-118279 | 5/1991 | Japan . |
| 3-118280 | 5/1991 | Japan . |
| 3-118281 | 5/1991 | Japan . |

*Primary Examiner*—Robert R. Song
*Attorney, Agent, or Firm*—Cushman, Darby & Cushman

[57] ABSTRACT

A rear under body structure of a vehicle in which a fuel tank is located on the rear side of a seat back of a rear seat, and is arranged on substantially the same straight line as an axis of a rear axle and on the lower side of a rear floor pan. Accordingly, the degree of freedom of the design of the styling of a rear windshield and its peripheral components of the vehicle is enhanced.

16 Claims, 18 Drawing Sheets

REAR UNDER BODY STRUCTURE

BACKGROUND OF THE INVENTION

1. Field of the Invention

The present invention relates to a rear under body structure of an automobile, and more particularly to a rear under body structure provided with a fuel tank.

2. Description of the Related Art

In a conventional rear under body structure of an automobile, a structure in which a fuel tank 72 is disposed beneath a rear seat 70, as shown in FIG. 17, is generally adopted. In this rear under body structure, however, the height H1 of the rear seat 70 from the ground is high, and in a case where a rear windshield 74 is provided at a lower position (the position indicated by a phantom line in FIG. 17), a head portion 78A of an occupant 78 abuts against the rear windshield 74. Hence, there has been a drawback in that restrictions are imposed on the styling of the rear windshield 74 and its peripheral components. For this reason, a structure disclosed in Japanese Utility Model Application Laid-Open No. 93125/1989 has been devised as a rear under body structure for overcoming this drawback.

As shown in FIG. 18, in this rear under body structure, a fuel tank 82 is disposed on the rear side, as viewed in the longitudinal direction of the vehicle, of a seat back 80A of a rear seat 80. For this reason, the height H2 of the rear seat 80 from the ground is low, so that this arrangement does not impose restrictions on the styling of a back windshield 84 and its peripheral components.

With this rear under body structure, however, the fuel tank 82 is disposed on the upper surface of a rear flower pan 86. Accordingly, since the center of gravity of the rear body becomes disadvantageously high due to the weight of the fuel tank 82, there has been a drawback in that the steering stability declines. Particularly in a front-engine front-drive (FF) vehicle in which the weight is distributed more heavily on the front wheels, since the center of gravity of the rear body becomes high, a shortage of traction of the rear wheels tends to be noticeable.

SUMMARY OF THE INVENTION

In view of the above-described circumstances, it is an object of the present invention to provide a rear under body structure which is capable of improving the steering stability without restricting the styling of a rear windshield and its peripheral components.

To this end, in accordance with one aspect of the present invention, there is provided a rear under body structure of a front-engine front-drive vehicle, comprising: a rear floor pan; and a fuel tank disposed on a rear side of a seat back and on a lower side of the rear floor pan, the fuel tank being arranged on substantially the same straight line as an axis of a rear axle connecting left and right rear wheels.

In accordance with this aspect of the present invention arranged as described above, since the fuel tank is disposed on the rear side of the seat back, the height of the seat cushion from the ground can be reduced as compared with a case where the fuel tank is disposed under the seat cushion. Accordingly, practically no restrictions are imposed on the styling of the rear windshield and its peripheral components. In addition, since the fuel tank is disposed beneath the rear floor pan and on substantially the same straight line as the axis of the rear axle connecting the left and right rear wheels, the center of gravity of the rear body becomes low owing to the load of the fuel tank, thereby making it possible to improve the steering stability.

In accordance with another aspect of the present invention, there is provided a rear under body structure of a front-engine front-drive vehicle, comprising: a rear floor pan disposed on a rear side of a seat back and having a projecting portion projecting upwardly as viewed in a vertical direction of the vehicle above a rear axle connecting left and right rear wheels; a fuel tank disposed in the projecting portion and arranged on substantially the same straight line as an axis of the rear axle; and a subframe supported by a pair of rear floor side members for supporting the rear floor pan, the subframe being formed substantially in a form of a rectangle surrounding four sides of the fuel tank.

In accordance with this aspect of the present invention arranged as described above, since the four sides of the fuel tank arranged on substantially the same straight line as the axis of the rear axle are surrounded by the subframe having the rectangular-shaped configuration, the fuel tank can be protected. At the same time, since the rectangular-shaped subframe is supported by the rear floor side members, the rigidity of the portion of the rear under body surrounding the axle can be improved. Hence, even in a case where an excessive load is applied to the rear under body from the rear suspension and the like, the amount of deformation of the rear under body can be reduced.

In accordance with still another aspect of the present invention, there is provided a rear under body structure of a front-engine front-drive vehicle, comprising: a fuel tank disposed on a rear side of a seat back and arranged on substantially the same straight line as an axis of a rear axle connecting left and right rear wheels; a subframe formed substantially in a form of a rectangle surrounding four sides of the fuel tank; a rear floor pan for covering the fuel tank from the upper side of the vehicle, the floor pan being divided into a front portion in the longitudinal direction of the vehicle and a rear portion in the longitudinal direction thereof at a position corresponding to a rear vertical wall portion of the fuel tank; and a cross member disposed at a divided portion of the rear floor pan and connecting together the front and rear portions, as viewed in the longitudinal direction of the vehicle, of the rear floor pan, the cross member supporting a rear portion of the subframe.

In accordance with the above-described aspect of the invention, since the rear floor pan is divided into the front portion in the longitudinal direction of the vehicle and the rear portion in the longitudinal direction thereof at a position corresponding to the rear vertical wall portion of the fuel tank, in a case where the portion of the rear floor pan covering the fuel tank is formed by press working, it is unnecessary to effect deep drawing. Accordingly, it is possible to improve the productivity of the rear floor pan as well as the dimensional accuracy. In addition, the front and rear portions, as viewed in the longitudinal direction of the vehicle, of the rear floor pan are connected to each other via the cross member, and the rear portion of the subframe is supported by this cross member. Accordingly, the rigidity of the portion of the rear under body supporting the fuel tank and surrounding the rear axle can be improved.

Accordingly, the present invention offers outstanding advantages in that practically no restrictions are imposed on the styling of the rear windshield and its peripheral components, i.e., the degree of freedom of the design of the rear windshield and its peripheral components can be enhanced, and that the steering stability can be improved The above and other objects, features and advantages of the invention will become more apparent from the following detailed description of the invention when read in conjunction with the accompanying drawings.

DESCRIPTION OF THE PREFERRED EMBODIMENTS

Figure 1:
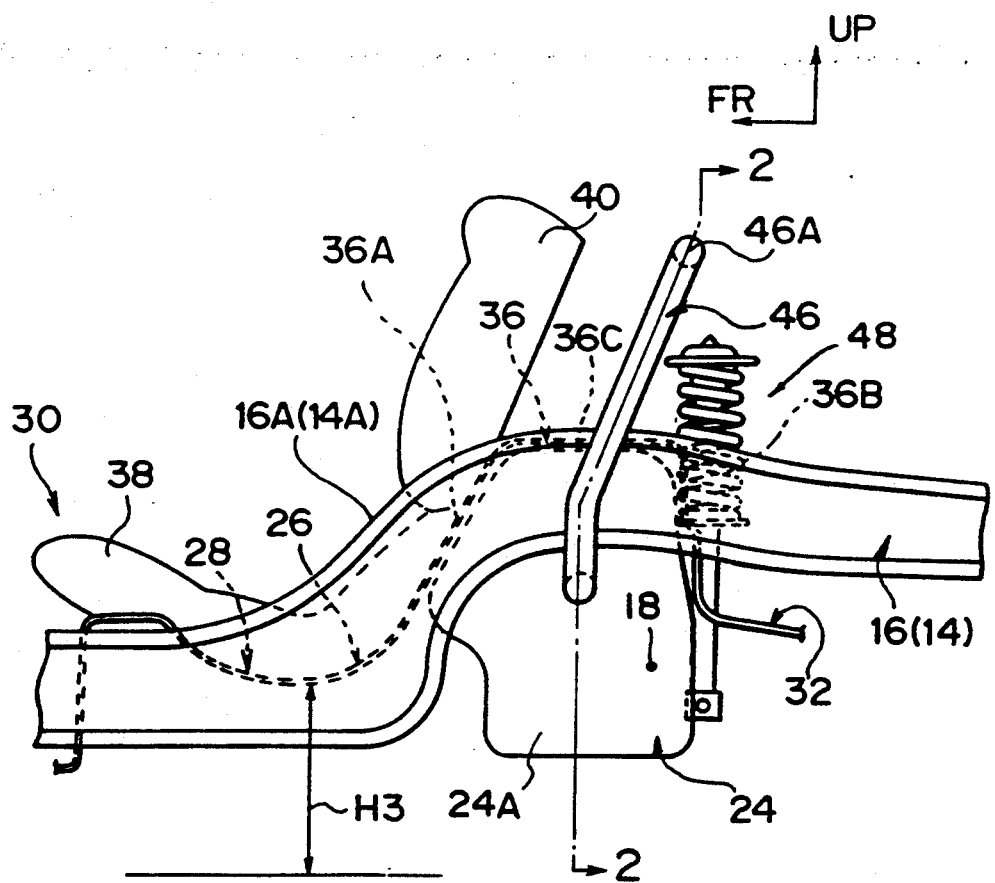
FIG. 1 is a side elevational view of a rear under body structure in accordance with a first embodiment of the present invention.

Referring now to the accompanying drawings, a description will be given of the embodiments of the present invention. It should be noted that arrow FR in the drawings indicates a forward direction of the vehicle, and arrow UP indicates an upward direction of the vehicle.

First, with reference to FIGS. 1 to 4, a description will be given of a rear under body structure in accordance with a first embodiment.

Figure 3:
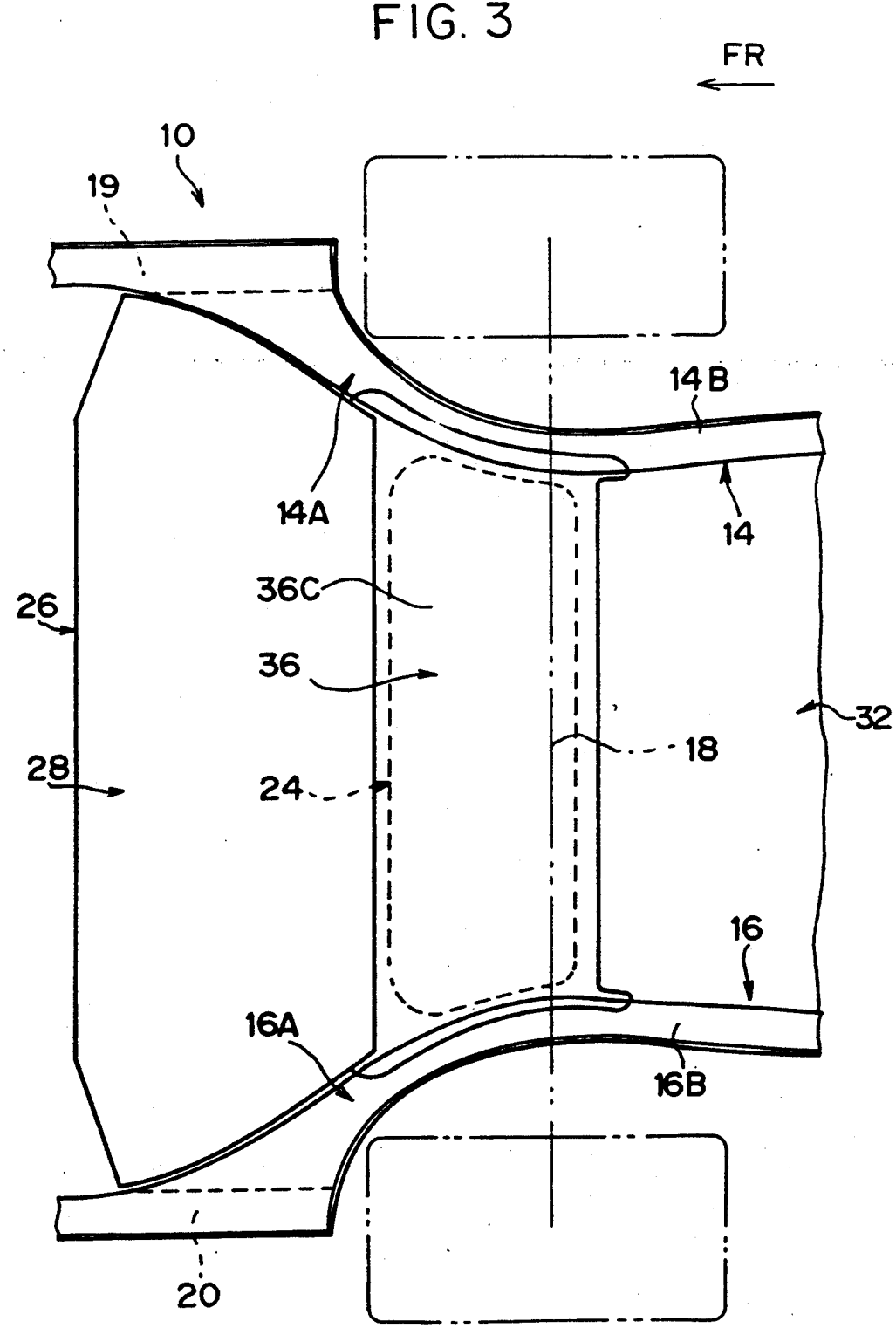
FIG. 3 is a plan view of the rear under body structure in accordance with the first embodiment.

As shown in FIG. 3, a rear floor side member (right) 14 and a rear floor side member (left) 16 are disposed at transversely opposite end portions of a rear under body 10 of a front-engine front-drive vehicle in such a manner as to be arranged substantially parallel with each other in the longitudinal direction of the vehicle.

Figure 2:
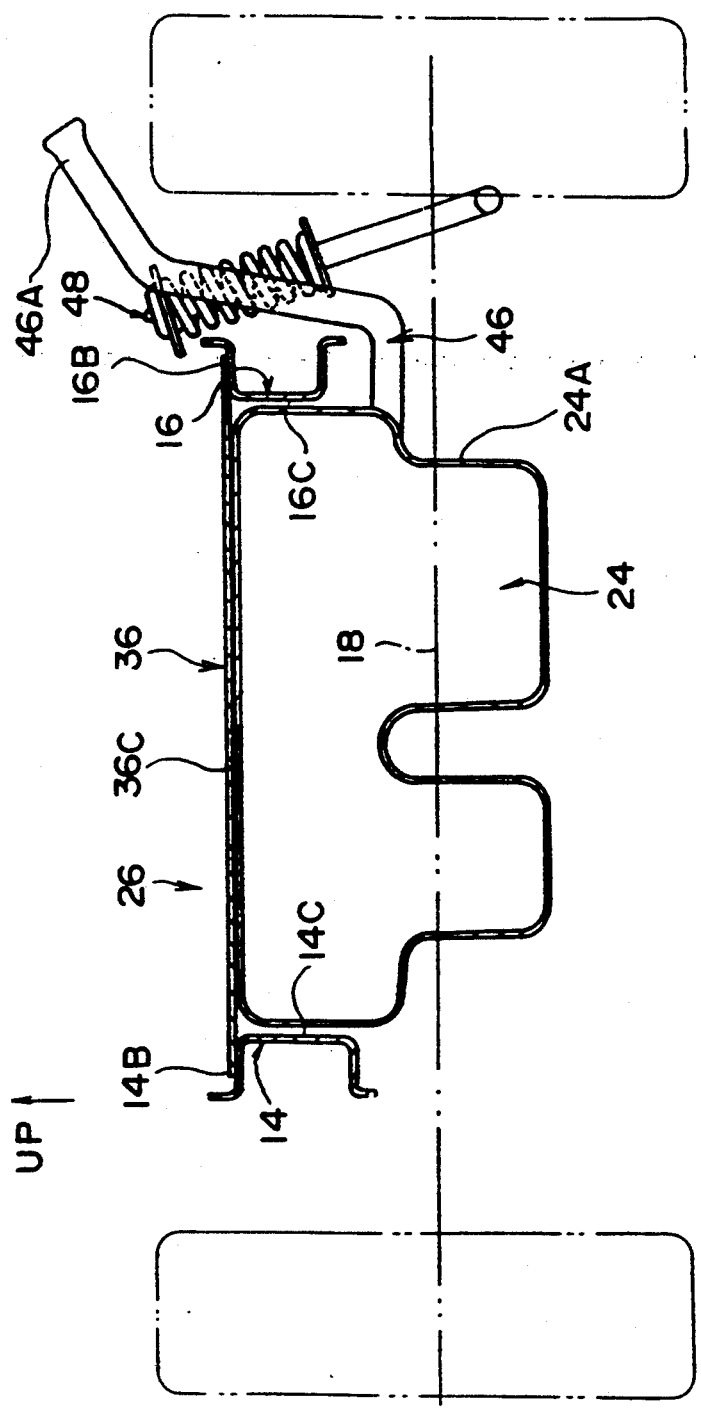
FIG. 2 is a cross-sectional view taken along the line 2—2 of FIG. 1.

As shown in FIG. 2, the rear floor side member (right) 14 and the rear floor side member (left) 16 are respectively provided with a U-shaped cross section whose opening is directed toward the transversely outer side of the vehicle. The rear floor side member (right) 14 and the rear floor side member (left) 16 are disposed above a rear axle 18 connecting left and right rear wheels.

As shown in FIG. 3, a front portion 14A of the rear floor side member (right) 14 is curved outwardly downward in the transverse direction of the vehicle, and its front end portion is welded onto a rear end portion of a side sill (right) 19 from the transversely inner side of the vehicle. Meanwhile, a front portion 16A of the rear floor side member (left) 16 is curved outwardly downward in the transverse direction of the vehicle, and its front end portion is welded onto a rear end portion of a side sill (left) 20 from the transversely inner side of the vehicle. A transversely elongated fuel tank 24 of a block type is disposed between the front portion 14A of the rear floor side member (right) 14 and the front portion 16A of the rear floor side member (left) 16. This fuel tank 24 is located on substantially the same straight line as an axis of the rear axle 18 connecting the left and right rear wheels.

Figure 4:
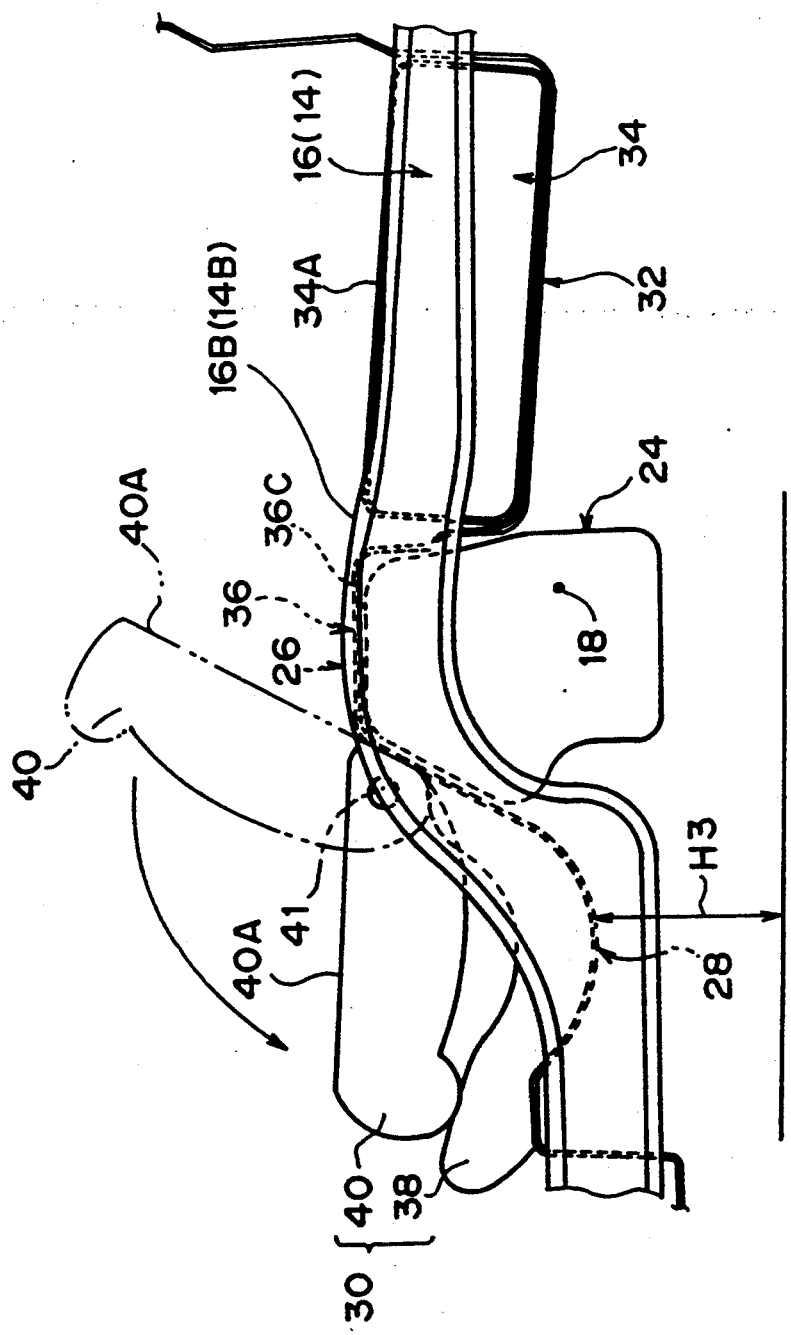
FIG. 4 is a side elevational view of the rear under body structure in accordance with the first embodiment.

As shown in FIGS. 1 and 2, a rear floor pan 26 is disposed between the rear floor side member (right) 14 and the rear floor side member (left) 16. As shown in FIG. 4, a front portion 28 of the rear floor pan 26 constitutes a cabin floor portion, and a seat cushion 38 of a rear seat 30 is arranged on the front portion 28 of the rear floor pan 26. Meanwhile, a rear portion 32 of the rear floor pan 26 constitutes a bottom portion of a trunk room, and a spare tire 34 is placed in the rear portion 32 of the rear floor pan 26.

As shown in FIG. 1, an intermediate portion of the rear floor pan 26 projects in a diagonally upward direction of the vehicle along an upper portion of the fuel tank 24, and is formed as a projecting portion 36. This projecting portion 36 has a substantially inverse U-shaped cross section as viewed in the transverse direction of the vehicle. A front portion of the projecting portion 36 of the rear floor pan 26 is formed as a front vertical wall portion 36A, while a rear portion of the projecting portion 36 of the rear floor pan 26 is formed as a rear vertical wall portion 36B. A portion between the front vertical wall portion 36A and the rear vertical wall portion 36B is formed as a substantially horizontal flat portion 36C.

As shown in FIG. 2, opposite end portions, as viewed in the transverse direction of the vehicle, of the flat portion 36C of the projecting portion 36 of the rear floor pan 26 are respectively welded onto an upper wall portion 14B of the rear floor side member (right) 14 and an upper wall portion 16B of the rear floor side member (left) 16. In addition, opposite end portions, as viewed in the transverse direction of the vehicle, of the front vertical wall portion 36A and the rear vertical wall portion 36B of the projecting portion 36 of the rear floor pan 26 are respectively welded onto an inner wall portion 14C, as viewed in the transverse direction of the vehicle, of the rear floor side member (right) 14 and an inner wall portion 16C, as viewed in the transverse direction of the vehicle, of the rear floor side member (left) 16.

Accordingly, the front vertical wall portion 36A and the rear vertical wall portion 36B of the projecting portion 36 of the rear floor pan 26 respectively connect the rear floor side member (right) 14 and the rear floor side member (left) 16 in the form of a bulkhead, respectively.

As shown in FIG. 4, a seat back 40 of the rear seat 30 is forwardly inclinable about a rotating shaft 41 disposed at a lower end thereof. In a case where the seat back 40 is inclined forwardly (in the state indicated by the solid line in FIG. 4), all of the following portions become substantially level: a rear surface 40A of the seat back 40, the flat portion 36C of the projecting portion 36 of the rear floor pan 26, the upper wall portion 14B of the rear floor side member (right) 14, the upper wall portion of the rear floor side member (left) 16, and a side surface 34A of the spare tire 34 of a standard size accommodated in the trunk room.

As shown in FIG. 2, a fuel inlet pipe 46 extends outwardly in the transverse direction of the vehicle from a left wall portion 24A, as viewed in the transverse direction of the vehicle, of the fuel tank 24 located forwardly of a rear suspension strut 48. This fuel inlet pipe 46 passes below a closed cross-sectional structure formed by the rear floor side member (left) 16 and a wheel house inner panel (not shown), and is bent in the upward direction of the vehicle. An upward end portion 46A of the fuel inlet pipe 46 reaches a quarter pillar (not shown).

A description will now be given of the operation of this first embodiment.

Figure 17:
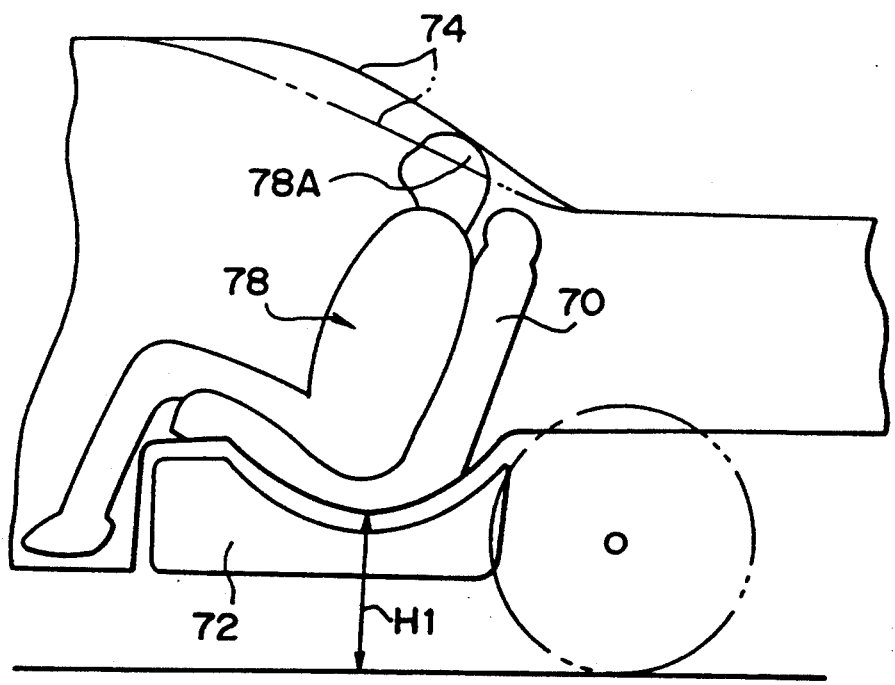
FIG. 17 is a side elevational view of a conventional rear under body structure.
Figure 18:
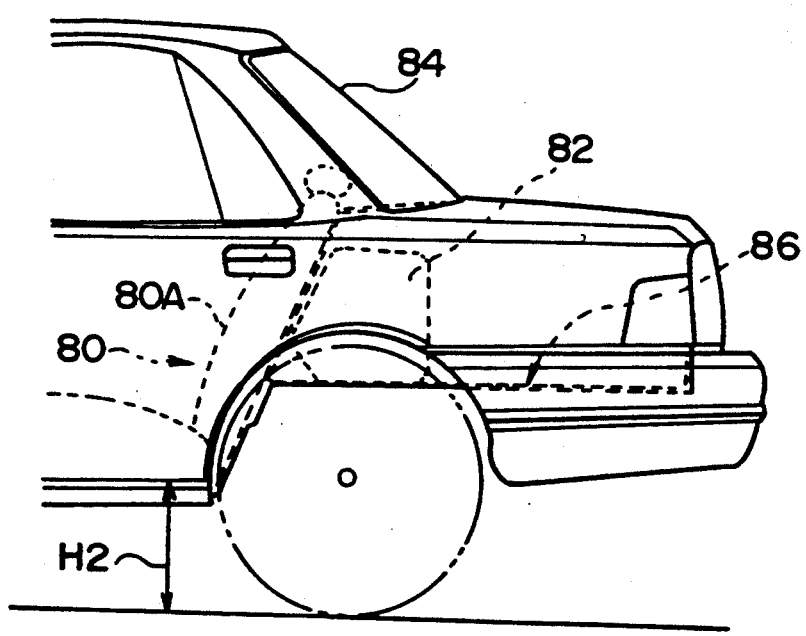
FIG. 18 is a side elevational view of another conventional rear under body structure.

In the first embodiment arranged as described above, since the fuel tank 24 is disposed on the rear side of the seat back 40 of the rear seat 30, it is possible to reduce the height H3 of the rear seat 30 from the ground as compared with the conventional structure in which the fuel tank is disposed beneath the seat cushion of the rear seat, as shown in FIG. 17. Accordingly, practically no restrictions are imposed on the styling of the rear windshield and its peripheral components. In addition, in this embodiment, since the fuel tank 24 is disposed underneath the flat portion 36C of the projecting portion 36 of the rear floor pan 26, which is located on substantially the same straight line as an axis of the rear axle 18, the center of gravity of the rear body becomes low because of the load of the fuel tank 24, thereby making it possible to improve the steering stability of the vehicle.

Figure 5:
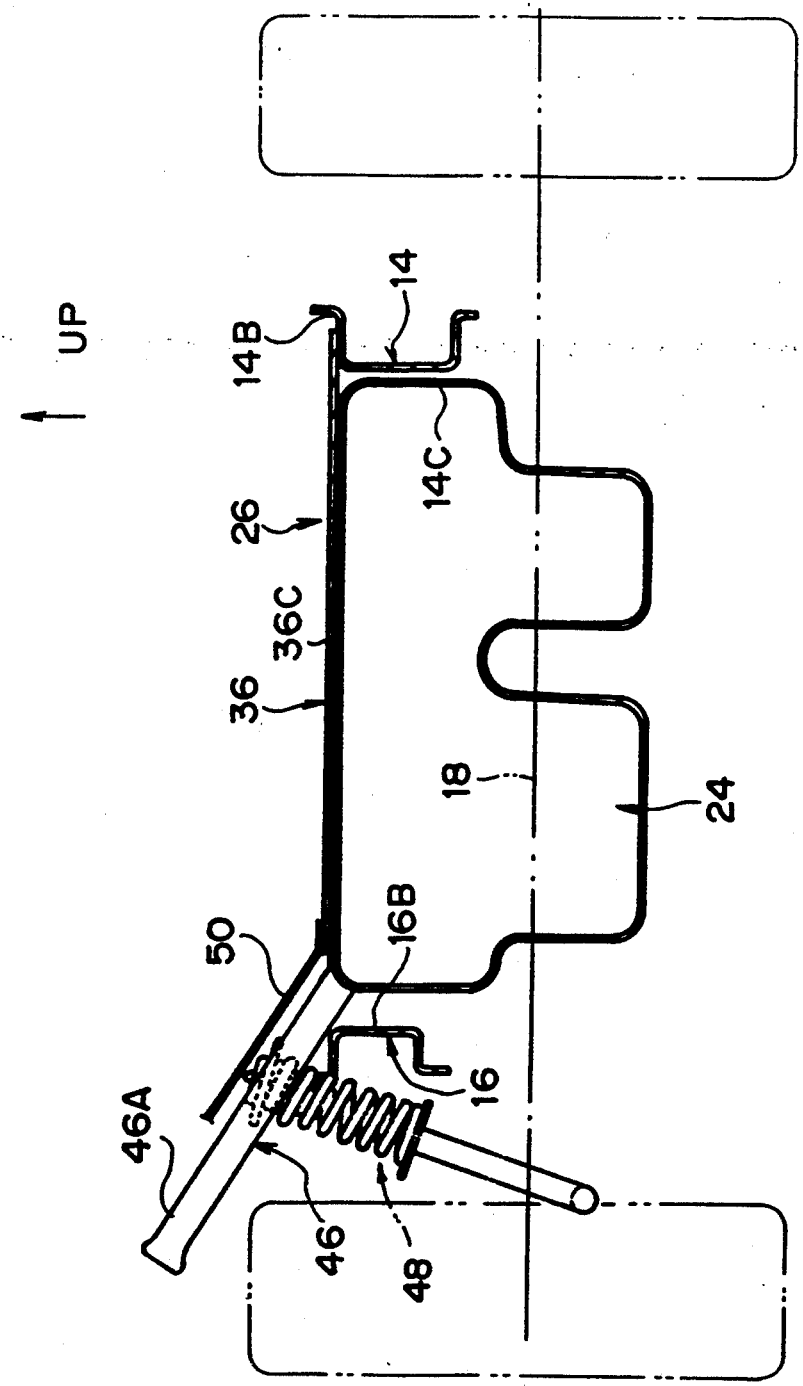
FIG. 5 is a cross-sectional view of a modification of the rear under body structure in accordance with the first embodiment and corresponds to FIG. 2.

It should be noted that although, in the above-described embodiment, the fuel inlet pipe 46 is arranged below the closed cross-sectional area formed by the rear floor side member (left) 16 and the wheel house inner panel (not shown), an arrangement may be alternatively provided such that, as shown in FIG. 5, the fuel inlet pipe 46 is arranged above a closed cross-sectional structure formed by the rear floor side member (left) 16 and the wheel house inner panel (not shown) so as to simplify the bent structure of the fuel inlet pipe 46. In this case, a panel 50 is provided for partitioning the interior of the vehicle compartment off the exterior of the vehicle compartment over the range of the wheel house inner panel, the rear floor side member (left) 16, and the rear floor pan 26.

Figure 6:
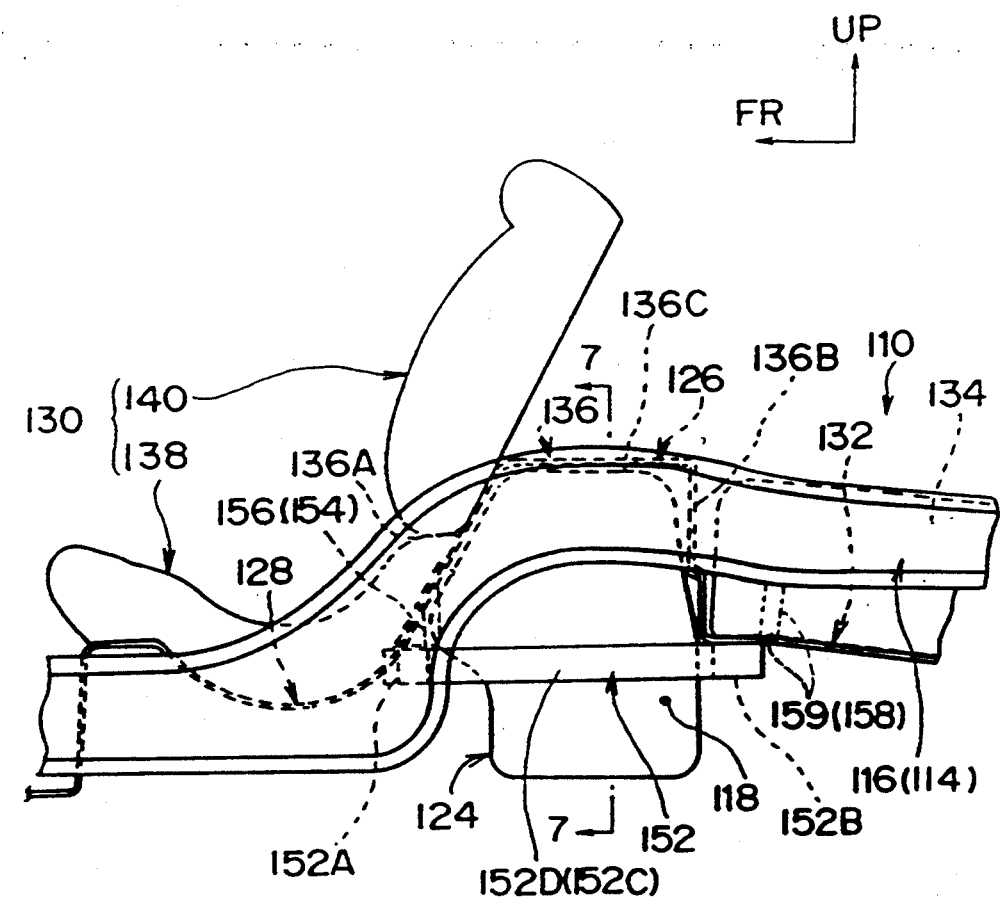
FIG. 6 is a cross-sectional view of a rear under body structure in accordance with a second embodiment.
Figure 7:
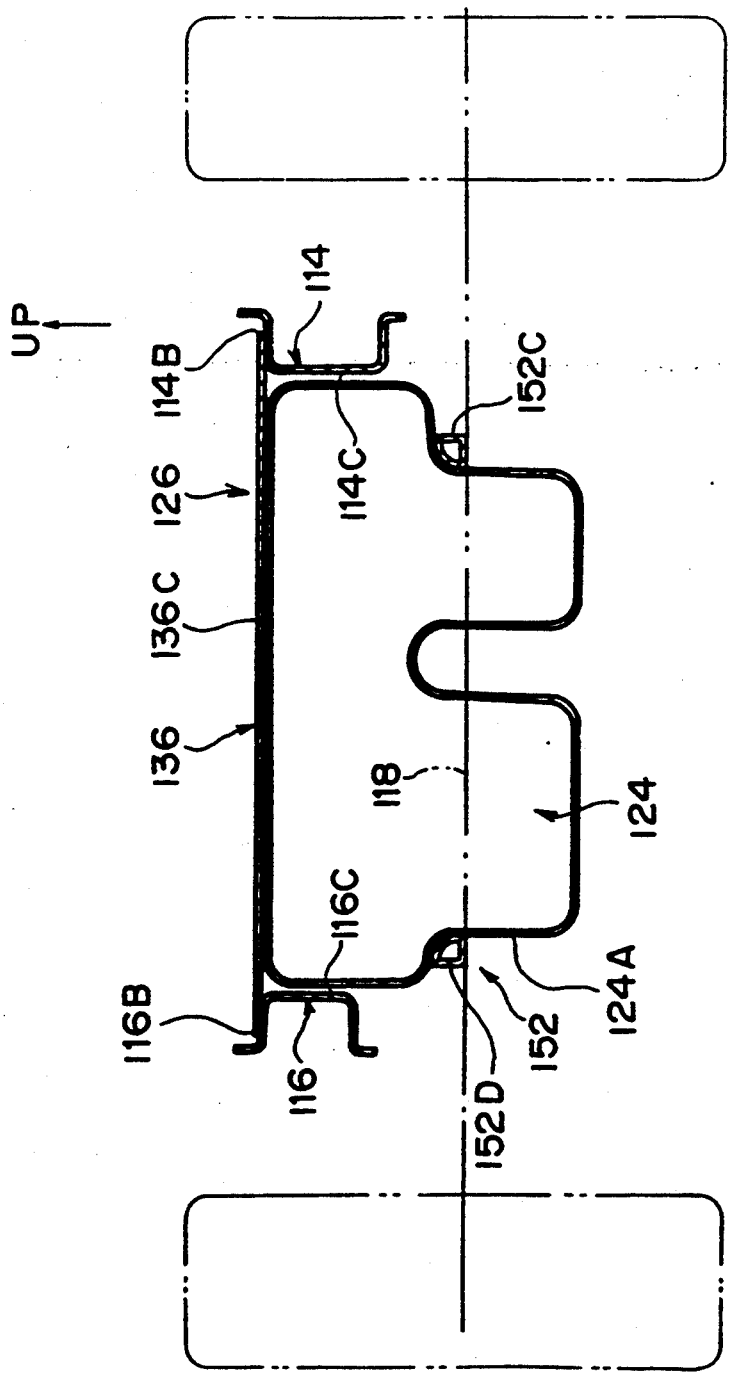
FIG. 7 is a cross-sectional view taken along the line 7—7 of FIG. 6.
Figure 8:
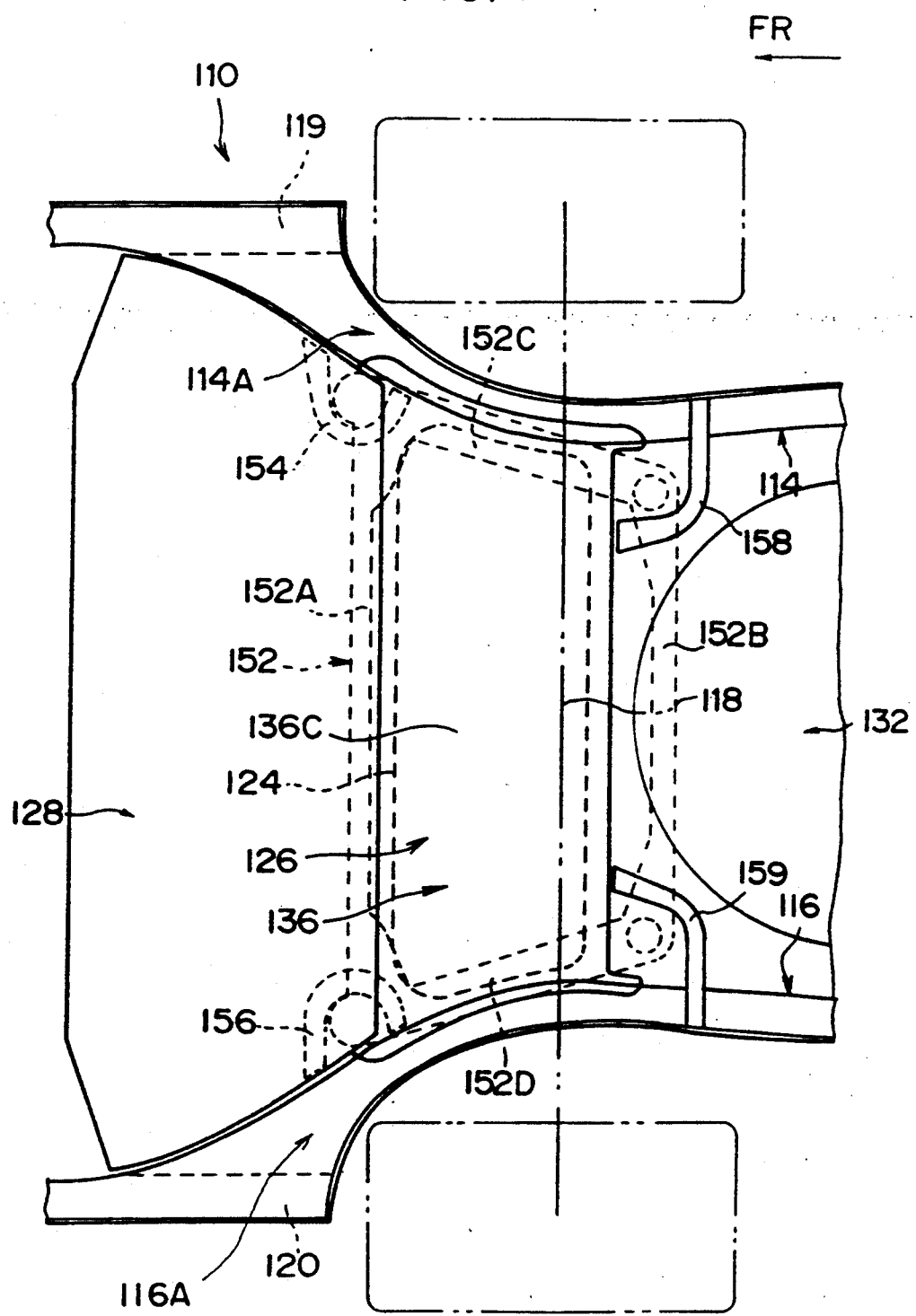
FIG. 8 is a plan view of the rear under body structure in accordance with the second embodiment.

Referring next to FIGS. 6 to 8, a description will be given of a second embodiment of the rear under body structure in accordance with the present invention.

As shown in FIG. 8, a rear floor side member (right) 114 and a rear floor side member (left) 116 are disposed at transversely opposite end portions of a rear under body 110 of a front-engine front-drive vehicle in such a manner as to be arranged substantially parallel with each other in the longitudinal direction of the vehicle.

As shown in FIG. 7, the rear floor side member (right) 114 and the rear floor side member (left) 116 are respectively provided with a U shaped cross section whose opening is directed toward the transversely outer side of the vehicle. The rear floor side member (right) 114 and the rear floor side member (left) 116 are disposed above a rear axle 118 connecting left and right rear wheels.

As shown in FIG. 8, a front portion 114A of the rear floor side member (right) 114 is curved outwardly downward in the transverse direction of the vehicle, and its front end portion is welded onto a rear end portion of a side sill (right) 119 from the transversely inner side of the vehicle. Meanwhile, a front portion 116A of the rear floor side member (left) 116 is curved outwardly downward in the transverse direction of the vehicle, and its front end portion is welded onto a rear end portion of a side sill (left) 120 from the transversely inner side of the vehicle. A transversely elongated fuel tank 124 of a block type is disposed between the front portion 114A of the rear floor side member (right) 114 and the front portion 116A of the rear floor side member (left) 116. This fuel tank 124 is located on substantially the same straight line as an axis of the rear axle 118.

As shown in FIG. 7, a rear floor pan 126 is disposed between the rear floor side member (right) 114 and the rear floor side member (left) 116.

As shown in FIG. 6, a front portion 128 of the rear floor pan 126 constitutes a cabin floor portion, and a seat cushion 138 of a rear seat 130 is arranged on the front portion 128 of the rear floor pan 126. Meanwhile, a rear portion 132 of the rear floor pan 126 constitutes a bottom portion of a trunk room, and a spare tire 134 is placed in a recess of the rear portion 132 of the rear floor pan 126.

An intermediate portion of the rear floor pan 126 projects in a diagonally upward direction of the vehicle along an upper portion of the fuel tank 124, and is formed as a projecting portion 136. This projecting portion 136 has a substantially inverse U-shaped cross section as viewed in the transverse direction of the vehicle. A front portion of the projecting portion 136 of the rear floor pan 126 is formed as a front vertical wall portion 136A, while a rear portion of the projecting portion 136 of the rear floor pan 126 is formed as a rear vertical wall portion 136B. A portion between the front vertical wall portion 136A and the rear vertical wall portion 136B is formed as a substantially horizontal flat portion 136C.

As shown in FIG. 7, opposite end portions, as viewed in the transverse direction of the vehicle, of the flat portion 136C of the projecting portion 136 of the rear floor pan 126 are respectively welded onto an upper wall portion 114B of the rear floor side member (right) 114 and an upper wall portion 116B of the rear floor side member (left) 116. In addition, opposite end portions, as viewed in the transverse direction of the vehicle, of the front vertical wall portion 136A and the rear vertical wall portion 136B of the projecting portion 136 of the rear floor pan 126 are respectively welded onto an inner wall portion 114C, as viewed in the transverse direction of the vehicle, of the rear floor side member (right) 114 and an inner wall portion 116C, as viewed in the transverse direction of the vehicle, of the rear floor side member (left) 116.

Accordingly, the front vertical wall portion 136A and the rear vertical wall portion 136B of the projecting portion 136 of the rear floor pan 126 respectively connect the rear floor side member (right) 114 and the rear floor side member (left) 116 in the form of a bulkhead, respectively.

As shown in FIG. 8, a rear subframe 152 having a substantially rectangular-shaped configuration, as viewed in a plan view, is disposed around the fuel tank 124 substantially horizontally on the lower side, as viewed in the vertical direction of the vehicle, of the rear floor pan 126. A front portion of this rear subframe 152 is formed as a front cross member 152A having a closed cross-sectional structure extending in the transverse direction of the vehicle. A rear portion of the rear subframe 152 is formed as a rear cross member 152B having a closed cross-sectional structure extending in the transverse direction of the vehicle. A right side member, as viewed in the transverse direction of the vehicle, of the rear subframe 152 is formed as a right side member 152C having a closed cross-sectional structure extending in the longitudinal direction of the vehicle along the front portion 114A of the rear floor side member (right) 114. Meanwhile, a left side member, as viewed in the transverse direction of the vehicle, of the rear subframe 152 is formed as a left side member 152D having a closed cross-sectional structure extending in the longitudinal direction of the vehicle along the front portion 116A of the rear floor side member (left) 116.

As shown in FIGS. 6 and 8, a right front bracket 154 is disposed on an inner portion, as viewed in the transverse direction of the vehicle, of a vicinity of the front end of the front portion 114A of the rear floor side member (right) 114. A front end portion of the right side member 152C of the rear subframe 152 is secured to this right front bracket 154 from the lower side of the vehicle via an unillustrated mount. Meanwhile, a left front bracket 156 is disposed on an inner portion, as viewed in the transverse direction of the vehicle, of a vicinity of the front end of the front portion 116A of the rear floor side member (left) 116. A front end portion of the left side member 152D of the rear subframe 152 is secured to this left front bracket 156 from the lower side of the vehicle via an unillustrated mount.

A right rear bracket 158 is disposed on a lower portion of a vicinity of the rear end of the front portion 114A of the rear floor side member (right) 114, and a rear end portion of the right side member 152C of the rear subframe 152 is secured to this right rear bracket 158 from the lower side of the vehicle via an unillustrated mount. Meanwhile, a left rear bracket 159 is disposed on a lower portion of a vicinity of the rear end of the front portion 116A of the rear floor side member (left) 116, and a rear end portion of the left side member 152D of the rear subframe 152 is secured to this left rear bracket 159 from the lower side of the vehicle via an unillustrated mount.

The operation of this second embodiment will be described hereafter.

In the second embodiment arranged as described above, a box-like space surrounding the fuel tank 124 is formed by the rear floor side member (right) 114, the rear floor side member (left) 116, the rear floor pan 126, and the subframe 152. The fuel tank 124 can be sufficiently protected by the rear floor side member (right) 114, the rear floor side member (left) 116, the rear floor pan 126, and the subframe 152. In addition, it is possible to improve the rigidity of the portion of the rear under body which surrounds the axle 118 and where the fuel tank 124 is disposed, since the rear subframe 152 surrounding the four sides of the fuel tank 124 in the form of a rectangle is supported by the rear floor side member (right) 114 and the rear floor side member (left) 116 via the right front bracket 154, the left front bracket 156, the right rear bracket 158, and the left rear bracket 159. Hence, even in the event that an excessive load is applied to the rear under body from the rear suspension and the like, the amount of deformation of the rear under body can be reduced.

Since this embodiment is arranged as described above, outstanding advantages are offered in that the fuel tank can be protected and that the rigidity of the portion rear under body surrounding the rear axle 118 can be improved.

Figure 9:
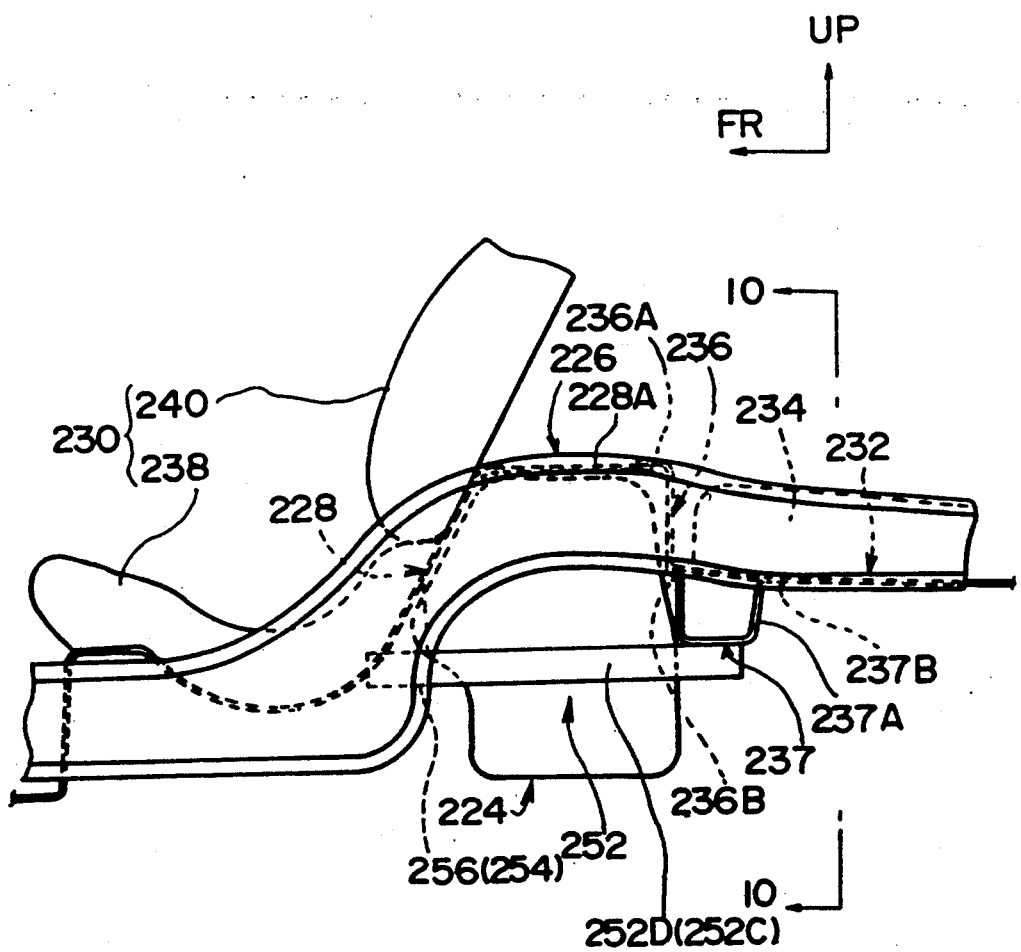
FIG. 9 is a side elevational view of a rear under body structure in accordance with a third embodiment of the present invention.
Figure 10:
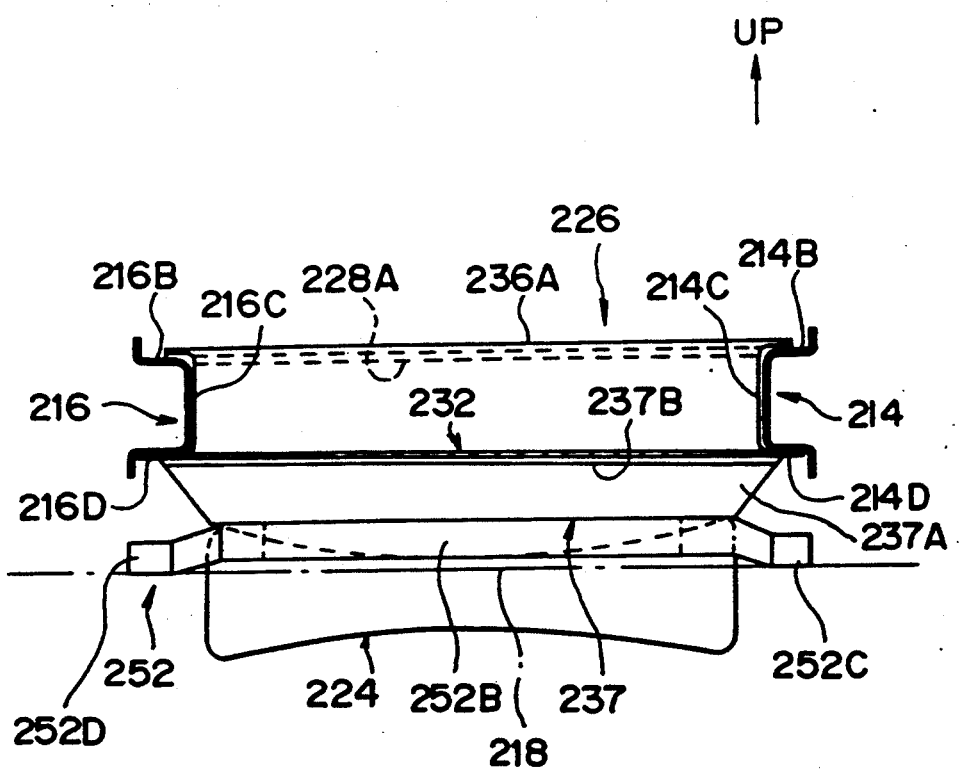
FIG. 10 is a cross-sectional view taken along the line 10—10 of FIG. 9.
Figure 11:
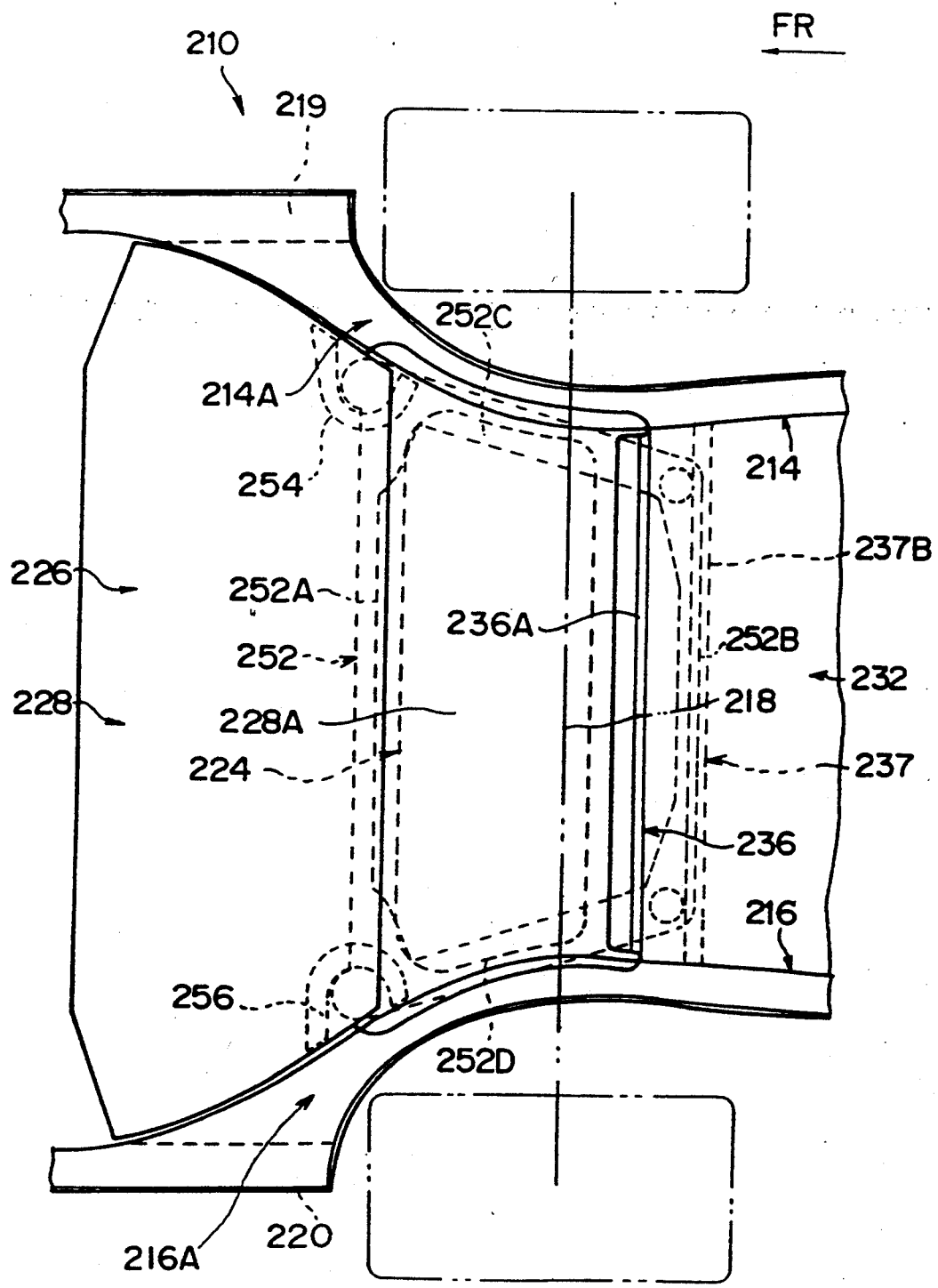
FIG. 11 is a plan view of the rear under body structure in accordance with the third embodiment.

Referring now to FIGS. 9 to 11, a description will be given of a third embodiment of the rear under body structure in accordance with the present invention.

As shown in FIG. 11, a rear floor side member (right) 214 and a rear floor side member (left) 216 are disposed at transversely opposite end portions of a rear under body 210 of a front-engine front-drive vehicle in such a manner as to be arranged substantially parallel with each other in the longitudinal direction of the vehicle.

As shown in FIG. 10, the rear floor side member (right) 214 and the rear floor side member (left) 216 are respectively provided with a U-shaped cross section whose opening is directed toward the transversely outer side of the vehicle. The rear floor side member (right) 214 and the rear floor side member (left) 216 are disposed above a rear axle 218 connecting left and right rear wheels.

As shown in FIG. 11, a front portion 214A of the rear floor side member (right) 214 is curved outwardly downward in the transverse direction of the vehicle, and its front end portion is welded onto a rear end portion of a side sill (right) 219 from the transversely inner side of the vehicle. Meanwhile, a front portion 216A of the rear floor side member (left) 216 is curved outwardly downward in the transverse direction of the vehicle, and its front end portion is welded onto a rear end portion of a side sill (left) 220 from the transversely inner side of the vehicle. A transversely elongated fuel tank 224 of a block type is disposed between the front portion 214A of the rear floor side member (right) 214 and the front portion 216A of the rear floor side member (left) 216. This fuel tank 224 is located on substantially the same straight line as an axis of the rear axle 218.

As shown in FIG. 10, a rear floor pan 226 is disposed between the rear floor side member (right) 214 and the rear floor side member (left) 216.

As shown in FIG. 9, the rear floor pan 226 is divided into two parts, i.e., a first rear floor pan member 228 located on the forward side, as viewed in the longitudinal direction of the vehicle, of the rear floor pan 226 and a second rear floor pan member 232 located on the rear side thereof. The first rear floor pan member 228 constitutes a cabin floor portion, and a seat cushion 238 of a rear seat 230 is disposed thereon. A rear portion of the first rear floor pan member 228 is curved in the diagonally upward direction of the vehicle along an upper portion of the fuel tank 224, while a rear end portion thereof is bent toward the rear side of the vehicle, and is formed as a horizontal portion 228A covering an upper surface of the fuel tank 224.

The second rear floor pan member 232 serves as a portion for accommodating a spare tire 234, and a front end portion of the second rear floor pan member 232 is located in proximity to a rear portion of the fuel tank 224. A cross member 236 is disposed between the horizontal portion 228A of the first rear floor pan member 228 and the second rear floor pan member 232. This cross member 236 is arranged along a rear wall portion of the fuel tank 224, and its upper end portion is bent toward the forward side of the vehicle and is formed as a flange 236A. This flange 236A is welded onto a rear end portion of the horizontal portion 228A of the first rear floor pan member 228 from the upper side of the vehicle. A stepped portion 236B projecting slightly toward the rear side of the vehicle is formed in a substantially central portion, as viewed in the vertical direction of the vehicle, of the cross member 236. A front end portion of the second rear floor pan member 232 is welded onto this stepped portion 236B from the lower side of the vehicle.

A lower portion of the stepped portion 236B of the cross member 236 is bent toward the rear side of the vehicle, and is formed as a U-shaped cross-sectional portion 237 which is upwardly open as viewed in the vertical direction of the vehicle. An upper end portion of a rear wall portion 237A of this U-shaped cross-sectional portion 237 is bent toward the rear side of the vehicle, and is formed as a flange 237B. This flange 237B is welded onto the second rear floor pan member 232 from the lower side of the vehicle.

As shown in FIG. 10, opposite end portions, as viewed in the transverse direction of the vehicle, of the flat portion 228A of the first rear floor pan member 228 are respectively welded onto an upper wall portion 214B of the rear floor side member (right) 214 and an upper wall portion 216B of the rear floor side member (left) 216. In addition, opposite end portions, as viewed in the transverse direction of the vehicle, of an upper portion of the cross member 236 are respectively welded onto an inner wall portion 214C, as viewed in the transverse direction of the vehicle, of the rear floor side member (right) 214 and an inner wall portion 216C, as viewed in the transverse direction of the vehicle, of the rear floor side member (left) 216. Meanwhile, opposite end portions, viewed in the transverse direction of the vehicle, of an upper portion of the cross member 236 are respectively welded onto a lower wall portion 214D of the rear floor side member (right) 214 and a lower wall portion 216D of the rear floor side member (left) 216.

As shown in FIG. 11, a rear subframe 252 having a substantially rectangular-shaped configuration as viewed in a plan view is disposed around the fuel tank 224 substantially horizontally on the lower side, as viewed in the vertical direction of the vehicle, of the rear floor pan 226. A front portion of this rear subframe 252 is formed as a front cross member 252A having a closed cross-sectional structure extending in the transverse direction of the vehicle. A rear portion of the rear subframe 252 is formed as a rear cross member 252B having a closed cross-sectional structure extending in the transverse direction of the vehicle. A right side member, as viewed in the transverse direction of the vehicle, of the rear subframe 252 is formed as a right side member 252C having a closed cross-sectional structure extending in the longitudinal direction of the vehicle along the front portion 214A of the rear floor side member (right) 214. Meanwhile, a left side member, as viewed in the transverse direction of the vehicle, of the rear subframe 252 is formed as a left side member 252D having a closed cross-sectional structure extending in the longitudinal direction of the vehicle along the front portion 216A of the rear floor side member (left) 216.

As shown in FIGS. 9 and 11, a right front bracket 254 is disposed on an inner portion, as viewed in the transverse direction of the vehicle, of a vicinity of the front end of the front portion 214A of the rear floor side member (right) 214. A front end portion of the right side member 252C of the rear subframe 252 is secured to this right front bracket 254 from the lower side of the vehicle via an unillustrated mount. Meanwhile, a left front bracket 256 is disposed on an inner portion, as viewed in the transverse direction of the vehicle, of a vicinity of the front end of the front portion 216A of the rear floor side member (left) 216. A front end portion of the left side member 252D of the rear subframe 252 is secured to this left front bracket 256 from the lower side of the vehicle via an unillustrated mount.

A right rear bracket 258 is disposed on a lower portion of a vicinity of the rear end of the front portion 214A of the rear floor side member (right) 214, and a rear end portion of the right side member 252C of the rear subframe 252 is secured to this right rear bracket 258 from the lower side of the vehicle via an unillustrated mount. Meanwhile, a left rear bracket 259 is disposed on a lower portion of a vicinity of the rear end of the front portion 216A of the rear floor side member (left) 216, and a rear end portion of the left side member 252D of the rear subframe 252 is secured to this left rear bracket 259 from the lower side of the vehicle via an unillustrated mount.

The operation of this third embodiment will be described hereafter.

In the third embodiment arranged as described above, since the rear floor pan 226 is divided into the first rear floor pan member 228 and the second rear floor pan member 232 at a position corresponding to the rear vertical wall portion of the fuel tank 224, in a case where the portion of the rear floor pan 226 covering the fuel tank 224 is formed by press working, it is unnecessary to effect deep drawing. Accordingly, it is possible to improve the productivity of the rear floor pan 226 as well as the dimensional accuracy. At the same time, in a case where galvanized sheet iron is used, the possibility of exfoliation of zinc owing to deep drawing is nil. In addition, the first rear floor pan member 228 and the second rear floor pan member 232 of the rear floor pan 226 are connected to each other via the cross member 236, and the rear portion of the rear subframe 252 is supported by this cross member 236. Accordingly, sufficient rigidity of the coupling portion between the first rear floor pan member 228 and the second rear floor pan member 232 of the rear floor pan 226 can be secured, and the rigidity of the components supporting the fuel tank 224 around the axle 218 can be improved.

In addition, in accordance with this third embodiment, since the plate thickness of the cross member 236 can be made different from the plate thickness of the rear floor pan 226, the degree of freedom of selection of the cross member 236 is enhanced. For this reason, the coupling rigidity of the rear floor side member (right) 214 and the rear floor side member (left) 216 can be made optimum by changing the plate thickness of the cross member 236. Furthermore, although the closed cross-sectional portion of the cross member has hitherto been disposed on a front side portion, as viewed in the longitudinal direction of the vehicle, of a spare-tire accommodating portion in a conventional structure, this closed cross-sectional portion of the cross member is disposed on the lower side of the rear portion 232 of the rear floor pan 22 constituting the portion for accommodating the spare tire 234. Hence, the spare tire 234 can be disposed more on the forward side of the vehicle by that margin, with the result that the rear overhang of the vehicle can be reduced, and the degree of freedom of the design of the external configuration of the vehicle can be enhanced.

Since this embodiment is arranged as described above, outstanding advantages can be offered in that the rigidity of the components surrounding the rear axle and supporting the fuel tank can be improved, and the dimensional accuracy thereof can be enhanced.

Referring now to FIGS. 12 to 16, a description will be given of a fourth embodiment.

Figure 14:
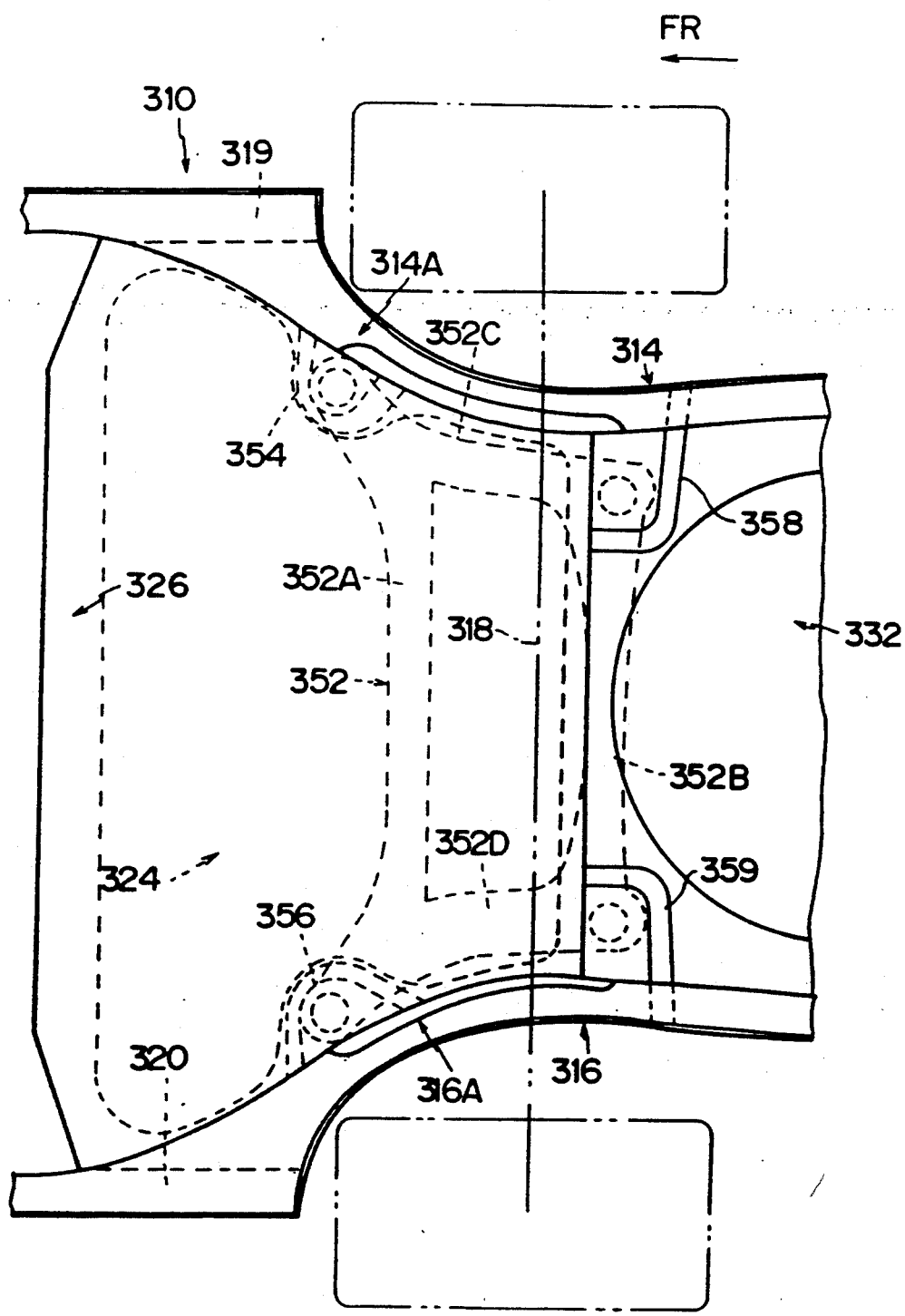
FIG. 14 is a plan view of the rear under body structure in accordance with the fourth embodiment.

As shown in FIG. 14, a rear floor side member (right) 314 and a rear floor side member (left) 316 are disposed at transversely opposite end portions of a rear under body 310 of an automobile body in accordance with this embodiment in such a manner as to be arranged substantially parallel with each other in the longitudinal direction of the vehicle.

Figure 13:
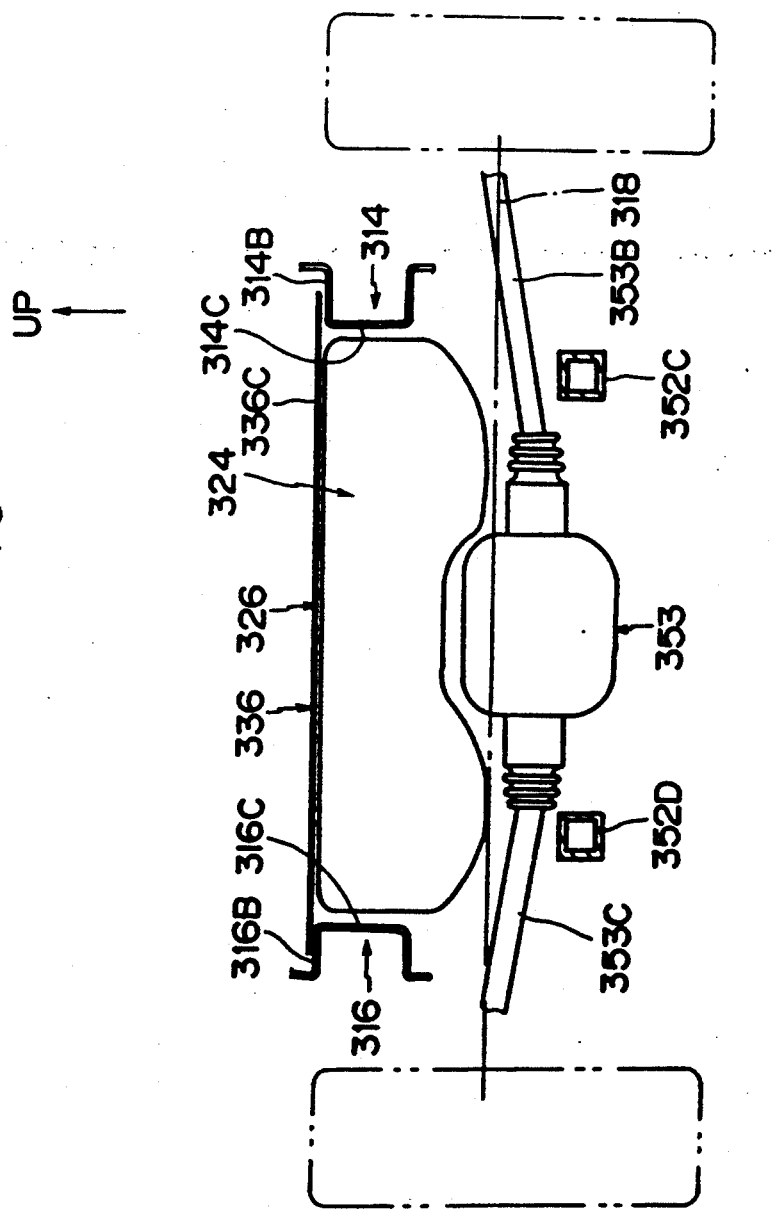
FIG. 13 is a cross-sectional view taken along the line 13—13 of FIG. 12.

As shown in FIG. 13, the rear floor side member (right) 314 and the rear floor side member (left) 316 are respectively provided with a U-shaped cross section whose opening is directed toward the transversely outer side of the vehicle. The rear floor side member (right) 314 and the rear floor side member (left) 316 are disposed above a rear axle 318, respectively.

As shown in FIG. 14, a front portion 314A of the rear floor side member (right) 314 is curved outwardly downward in the transverse direction of the vehicle, and its front end portion is welded onto a rear end portion of a side sill (right) 319 from the transversely inner side of the vehicle. Meanwhile, a front portion 316A of the rear floor side member (left) 316 is curved outwardly downward in the transverse direction of the vehicle, and its front end portion is welded onto a rear end portion of a side sill (left) 320 from the transversely inner side of the vehicle. A fuel tank 324 is disposed between the front portion 314A of the rear floor side member (right) 314 and the front portion 316A of the rear floor side member (left) 316.

Figure 12:
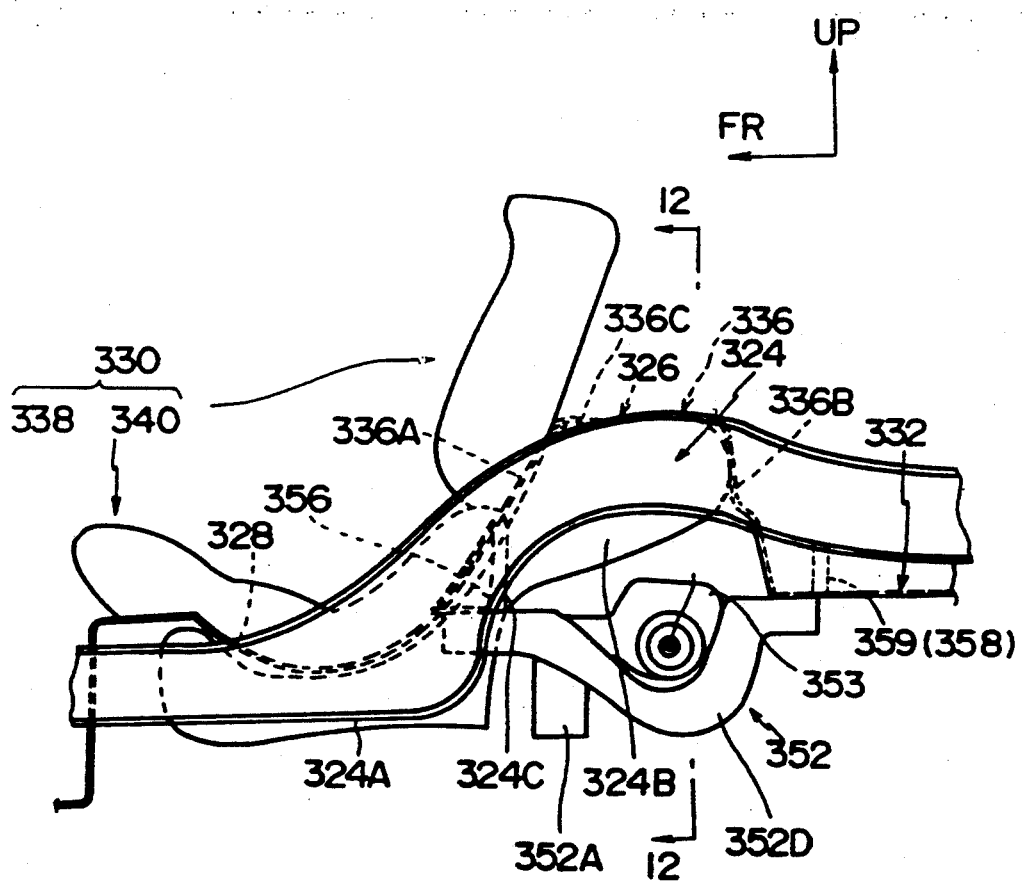
FIG. 12 is a side elevational view of a rear under body structure in accordance with a fourth embodiment.

As shown in FIGS. 12 and 13, a rear floor pan 326 is disposed between the rear floor side member (right) 314 and the rear floor side member (left) 316. As shown in FIG. 12, a seat cushion 338 of a rear seat 330 is arranged on a front portion 328 of the rear floor pan 326. Meanwhile, a rear portion 332 of the rear floor pan 326 constitutes a bottom portion of a trunk room.

An intermediate portion of the rear floor pan 326 projects in a diagonally upward direction of the vehicle along an upper portion of the fuel tank 324, and is formed as a projecting portion 336. This projecting portion 336 has a substantially inverse U-shaped cross section as viewed in the transverse direction of the vehicle. A front portion of the projecting portion 336 of the rear floor pan 326 is formed as a front vertical wall portion 336A, while a rear portion of the projecting portion 336 of the rear floor pan 326 is formed as a rear vertical wall portion 336B. A portion between the front vertical wall portion 336A and the rear vertical wall portion 336B is formed as a substantially horizontal flat portion 336C.

As shown in FIG. 13, opposite end portions, as viewed in the transverse direction of the vehicle, of the flat portion 336C of the projecting portion 336 of the rear floor pan 326 are respectively welded onto an upper wall portion 314B of the rear floor side member (right) 314 and an upper wall portion 316B of the rear floor side member (left) 316. In addition, opposite end portions, as viewed in the transverse direction of the vehicle, of the front vertical wall portion 336A and the rear vertical wall portion 336B of the projecting portion 336 of the rear floor pan 326 are respectively welded onto an inner wall portion 314C, as viewed in the transverse direction of the vehicle, of the rear floor side member (right) 314 and an inner wall portion 316C, as viewed in the transverse direction of the vehicle, of the rear floor side member (left) 316.

Accordingly, the front vertical wall portion 336A and the rear vertical wall portion 336B of the projecting portion 336 of the rear floor pan 326 respectively connect the rear floor side member (right) 314 and the rear floor side member (left) 316 in the form of a bulkhead, respectively.

As shown in FIG. 12, a front portion 324A of the fuel tank 324 is arranged along the front portion 328 of the rear floor pan 326 on the lower side of the front portion 328 of the rear floor pan 326, and its thickness in the vertical direction of the vehicle is made thin. In addition, a rear portion 324B of the fuel tank 324 is arranged along the projecting portion 336 of the rear floor pan 326 on the lower side of the flat portion 336C of the projecting portion 336 of the rear floor pan 326, and its thickness in the vertical direction of the vehicle is made large. The front portion 324A of the fuel tank 324 and the rear portion 324B of the fuel tank 324 are connected to each other by a connecting portion 324C disposed along the front vertical wall portion 336A of the projecting portion 336 of the rear floor pan 326.

Figure 15:
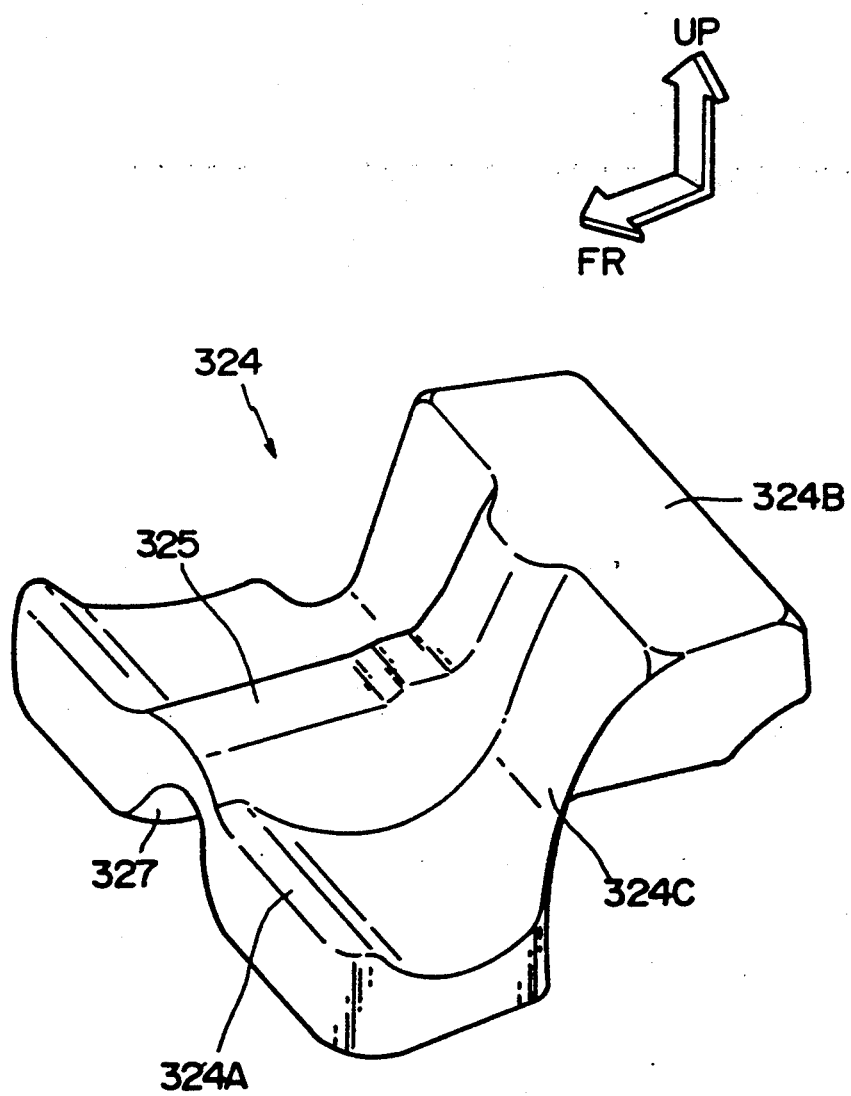
FIG. 15 is a perspective view, taken from the diagonally forward direction of the vehicle, of a fuel tank in accordance with the fourth embodiment.

As shown in FIG. 15, a projecting portion 325 projecting in the upward direction of the vehicle along a floor tunnel portion is formed in a central portion, as viewed in the transverse direction of the vehicle, of the front portion 324A of the fuel tank 324. A recessed portion 327 recessed in the upward direction of the vehicle is formed in a bottom portion of the fuel tank 324 facing this projecting portion 325 and arranged in the longitudinal direction of the vehicle.

As shown in FIG. 14, a rear subframe 352 having a substantially rectangular-shaped, configuration as viewed in a plan view is disposed around the fuel tank 324 substantially horizontally on the lower side, as viewed in the vertical direction of the vehicle, of the rear floor pan 326. A front portion of this rear subframe 352 is formed as a front cross member 352A having a closed cross-sectional structure extending in the transverse direction of the vehicle. A rear portion of the rear subframe 352 is formed as a rear cross member 352B having a closed cross-sectional structure extending in the transverse direction of the vehicle. A right side member, as viewed in the transverse direction of the vehicle, of the rear subframe 352 is formed as a right side member 352C having a closed cross-sectional structure extending in the longitudinal direction of the vehicle along the front portion 314A of the rear floor side member (right) 314. Meanwhile, a left side member, as viewed in the transverse direction of the vehicle, of the rear subframe 352 is formed as a left side member 352D having a closed cross-sectional structure extending in the longitudinal direction of the vehicle along the front portion 316A of the rear floor side member (left) 316.

Figure 16:
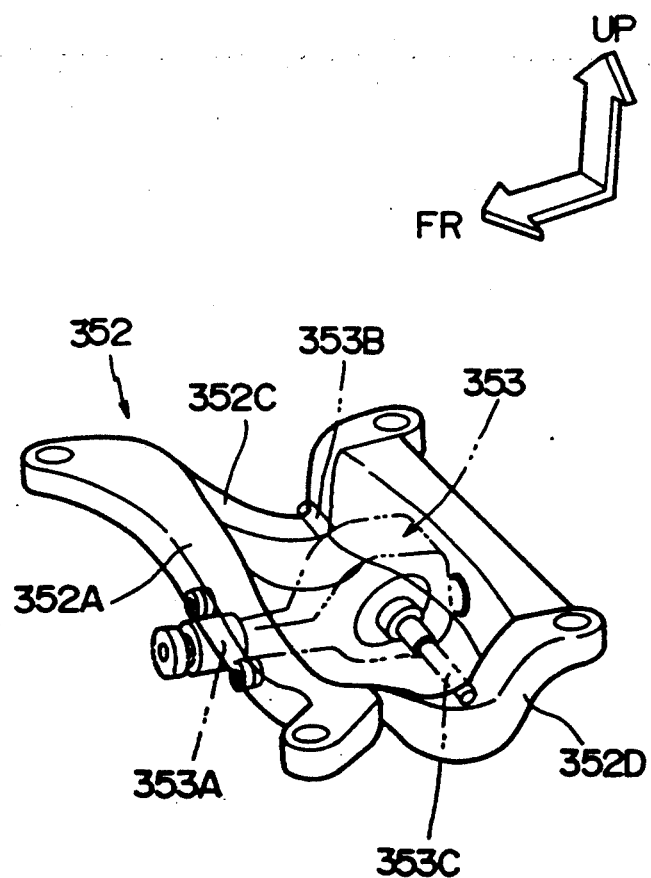
FIG. 16 is a perspective view, taken from the diagonally forward direction of the vehicle, of a rear subframe in accordance with the fourth embodiment.

As shown in FIG. 16, a substantially central portion, as viewed in the transverse direction of the vehicle, of the front cross member 352A of the rear subframe 352 is curved toward the lower side of the vehicle, and a coupling portion 353A for coupling with a propeller shaft disposed in front of a rear differential gear unit 353 is accommodated in this curved portion from the upward side of the vehicle. In addition, the propeller shaft is accommodated in the recessed portion 327 in the bottom portion of the fuel tank 324 shown in FIG. 15. A substantially central portion, as viewed in the longitudinal direction of the vehicle, of the right side member 352C of the rear subframe 352 is curved toward the lower side of the vehicle, and a right drive shaft 353B of the rear differential gear unit 353 is accommodated in this curved portion from the upper side of the vehicle. Meanwhile, a substantially central portion, as viewed in the longitudinal direction of the vehicle, of the left side member 352D of the rear subframe 352 is also curved toward the lower side of the vehicle, and a left drive shaft 353C of the rear differential gear unit 353 is accommodated in this curved portion from the upper side of the vehicle.

As shown in FIGS. 12 and 14, a right front bracket 354 is disposed on an inner portion, as viewed in the transverse direction of the vehicle, of a vicinity of the front end of the front portion 314A of the rear floor side member (right) 314. A front end portion of the right side member 352C of the rear subframe 352 is secured to this right front bracket 354 from the lower side of the vehicle via an unillustrated mount. Meanwhile, a left front bracket 356 is disposed on an inner portion, as viewed in the transverse direction of the vehicle, of a vicinity of the front end of the front portion 316A of the rear floor side member (left) 316. A front end portion of the left side member 352D of the rear subframe 352 is secured to this left front bracket 356 from the lower side of the vehicle via an unillustrated mount.

A right rear bracket 358 is disposed on a lower portion of a vicinity of the rear end of the front portion 314A of the rear floor side member (right) 314, and a rear end portion of the right side member 352C of the rear subframe 352 is secured to this right rear bracket 358 from the lower side of the vehicle via an unillustrated mount. Meanwhile, a left rear bracket 359 is disposed on a lower portion of a vicinity of the rear end of the front portion 316A of the rear floor side member (left) 316, and a rear end portion of the left side member 352D of the rear subframe 352 is secured to this left rear bracket 359 from the lower side of the vehicle via an unillustrated mount.

The operation of this fourth embodiment will be described hereafter.

In the fourth embodiment arranged as described above, the fuel tank 324 is arranged beneath the rear floor pan 326 in such a manner as to straddle a space below the seat cushion 338 of the rear seat 330 and a space below the projecting portion 336 of the rear floor pan 326. Accordingly, the thickness of the front portion 324A of the fuel tank 324 can be made small, thereby making it possible to sufficiently secure the vehicle compartment space above the seat. In addition, since the fuel tank 324 straddles the space below the seat cushion 338 of the rear seat 330 and the space below the projecting portion 336 of the rear floor pan 326, the capacity of the fuel tank 324 can be made large as compared with the conventional structure in which, for instance, the fuel tank is disposed below the seat cushion only.

In addition, in this embodiment, the rear overhang can be made short, and the overall length of the vehicle can be made short. At the same time, the rear floor can be used commonly for the four-wheel drive vehicle and the FF vehicle.

Since this embodiment is arranged as described above, outstanding advantages can be offered in that the vehicle compartment space above the seat cushion can be sufficiently secured, and that the capacity of the fuel tank can be made large.

What is claimed is:

1. A rear under body structure of a front-engine front drive vehicle, comprising:
    a rear floor pan;
    a fuel tank disposed on a rear side of a seat back and on a lower side of said rear floor pan, said fuel tank being arranged on substantially the same straight line as an axis of a rear axle connecting left and right rear wheels;
    rear floor side members connected to opposing sides of said rear floor pan; and
    a subframe surrounding four sides of said fuel tank, said subframe being supported by said rear floor side members.

2. A rear under body structure according to claim 1, wherein said rear floor pan has a projecting portion projecting upwardly from an intermediate portion thereof, as viewed in a longitudinal direction of said vehicle, said fuel tank being disposed on a lower side of said projecting portion.

3. A rear under body structure according to claim 2, wherein said fuel tank has a portion accommodated in said projecting portion.

4. A rear under body structure according to claim 2, wherein said projecting portion is connected to said rear floor side members.

5. A rear under body structure according to claim 2, wherein said projecting portion has a top portion formed with a flat surface conforming with a substantially horizontal plane.

6. A rear under body structure according to claim 1, wherein said subframe has a closed cross-sectional structure.

7. A rear under body structure according to claim 1, wherein said rear floor pan comprises a first rear floor pan member located on a front side as viewed in the longitudinal direction of said vehicle and a second rear floor pan member located on a rear side as viewed in the longitudinal direction of said vehicle.

8. A rear under body structure according to claim 7, wherein said first rear floor pan member and said second rear floor pan member are divided at a position corresponding to a rear vertical wall portion of said fuel tank.

9. A rear under body structure according to claim 8, further comprising a cross member connecting a rear portion of said first rear floor pan member with a front portion of said second rear floor pan member.

10. A rear under body structure according to claim 9, wherein said first rear floor pan member and said second rear floor pan member are connected to said rear floor side members.

11. A rear under body structure according to claim 10, wherein said subframe has its rear portion supported by said cross member.

12. A rear under body structure of a front-engine front drive vehicle, comprising:
- a rear floor pan;
- a fuel tank disposed on a rear side of a seat back and on a lower side of said rear floor pan, said fuel tank being arranged on substantially the same straight line as an axis of a rear axle connecting left and right rear wheels, said rear floor pan having a projecting portion projecting upwardly in such a manner as to accommodate an upper portion of said fuel tank;
- rear floor side members connected to opposing sides of said rear floor pan; and
- a subframe supported by said rear floor side members, said subframe surrounding four sides of said fuel tank.

13. A rear under body structure according to claim 12, wherein said subframe has a closed cross-sectional structure.

14. A rear under body structure according to claim 12, wherein said rear floor pan comprises a first rear floor pan member located on a front side as viewed in the longitudinal direction of said vehicle and a second rear floor pan member located on a rear side as viewed in the longitudinal direction of said vehicle, said first rear floor pan member and said second rear floor pan member being divided at a position corresponding to a rear vertical wall portion of said fuel tank.

15. A rear under body structure according to claim 14, further comprising a cross member connecting together said first rear floor pan member and said second rear floor pan member.

16. A rear under body structure according to claim 12, wherein said projecting portion has a top portion formed with a flat surface conforming with a substantially horizontal plane.

* * * * *